United States Patent
Ikeda

(10) Patent No.: US 7,113,490 B2
(45) Date of Patent: Sep. 26, 2006

(54) COMMUNICATION SEQUENCE, DATA CIRCUIT-TERMINATING EQUIPMENT, DATA TERMINAL EQUIPMENT, AND STORAGE MEDIUM STORING COMMUNICATION CONTROL PROGRAM

(75) Inventor: Muneaki Ikeda, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 1038 days.

(21) Appl. No.: 10/024,080

(22) Filed: Dec. 17, 2001

(65) Prior Publication Data

US 2003/0112769 A1 Jun. 19, 2003

(51) Int. Cl.
*H04B 1/44* (2006.01)
*H04J 3/12* (2006.01)
*H04L 5/16* (2006.01)
*G06F 15/16* (2006.01)

(52) U.S. Cl. ............... 370/278; 370/282; 370/522; 358/1.13; 358/1.15; 375/220; 709/227

(58) Field of Classification Search ............... 370/278, 370/282, 522; 358/1.13, 1.15; 375/220; 709/227
See application file for complete search history.

(56) References Cited

U.S. PATENT DOCUMENTS

| | | | |
|---|---|---|---|
| 5,012,489 A * | 4/1991 | Burton et al. ............... 375/222 |
| 5,282,208 A * | 1/1994 | Takayama et al. .......... 370/477 |
| 5,633,890 A * | 5/1997 | Ahmed ....................... 375/219 |
| 5,644,593 A * | 7/1997 | Bailey et al. ................ 375/222 |
| 5,657,345 A * | 8/1997 | Lazaridis ..................... 375/222 |
| 5,726,764 A * | 3/1998 | Averbuch et al. ........... 358/403 |
| 5,739,919 A * | 4/1998 | Lee et al. .................... 358/407 |
| 5,784,633 A * | 7/1998 | Petty ........................... 710/60 |
| 5,938,731 A * | 8/1999 | Schreiter .................... 709/227 |
| 6,122,498 A * | 9/2000 | Sipila ......................... 455/403 |
| 6,298,121 B1 * | 10/2001 | Samson et al. .......... 379/93.09 |
| 6,687,287 B1 * | 2/2004 | Antol ......................... 375/222 |
| 6,704,350 B1 * | 3/2004 | Ryu et al. ................... 375/222 |

\* cited by examiner

*Primary Examiner*—Alpus H. Hsu
(74) *Attorney, Agent, or Firm*—Frishauf, Holtz, Goodman & Chick, P.C.

(57) ABSTRACT

A DCE sends a first command to a DTE if data transmission from the DCE has not ended at a predetermined timing after the end of data transfer from the DTE to the DCE. The DTE sends a second command to the DCE at an arbitrary timing upon reception of the first command. Upon reception of the second command, the DCE sends to the DTE the first command if data transmission has not ended, or a third command if data transmission has ended. The DTE and DCE execute a post-data transmission procedure after they exchange the third command.

9 Claims, 2 Drawing Sheets

COMMUNICATION SEQUENCE, DATA CIRCUIT-TERMINATING EQUIPMENT, DATA TERMINAL EQUIPMENT, AND STORAGE MEDIUM STORING COMMUNICATION CONTROL PROGRAM

BACKGROUND OF THE INVENTION

1. Field of the Invention

The present invention relates to data communication by a class-2 service.

2. Description of the Related Art

The communication sequence of the class-2 service is known as, e.g., an ITU-T (International Telecommunication Union-Telecommunication sector) recommendation T.32.

The class-2 service asynchronously executes data transfer from a data terminal equipment (to be referred to as DTE hereinafter) to a data circuit-terminating equipment (to be referred to as DCE hereinafter), and data transmission from the DCE to the circuit. That is, the class-2 service can end data transfer from the DTE to the DCE regardless of the execution status of data transmission from the DCE to the circuit.

The ITU-T recommendation T.32 stipulates that the DTE waits for a command from the DCE after the end of image data transfer to the DCE. The recommendation T.32 also stipulates that the DCE should send to the DTE a command representing the end of data transmission to the circuit after the DCE receives data transferred from the DTE.

Hence, the DTE must wait for a command from the DCE until the DCE ends data transmission to the circuit and sends a command representing the end of data transmission.

BRIEF SUMMARY OF THE INVENTION

It is an object of the present invention to shorten the command wait time of a data terminal equipment.

According to one aspect of the invention, there is provided the following communication sequence.

Transmission of data from a data terminal equipment to a circuit via a data circuit-terminating equipment is performed by asynchronously executing transmission of the data from the data terminal equipment to the data circuit-terminating equipment and transmission of the data from the data circuit-terminating equipment to the circuit. At this time, the data circuit-terminating equipment sends a first command to the data terminal equipment if transmission of the data from the data circuit-terminating equipment has not ended at a predetermined timing after end of transfer of the data from the data terminal equipment to the data circuit-terminating equipment. The data terminal equipment sends a second command to the data circuit-terminating equipment at an arbitrary timing upon reception of the first command. Upon reception of the second command, the data circuit-terminating equipment sends the first command if transmission of the data has not ended, and a third command if transmission of the data has ended. The data terminal equipment and the data circuit-terminating equipment execute a post-data transmission procedure after the third command is exchanged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the several views of the accompanying drawing.

Figure 1:
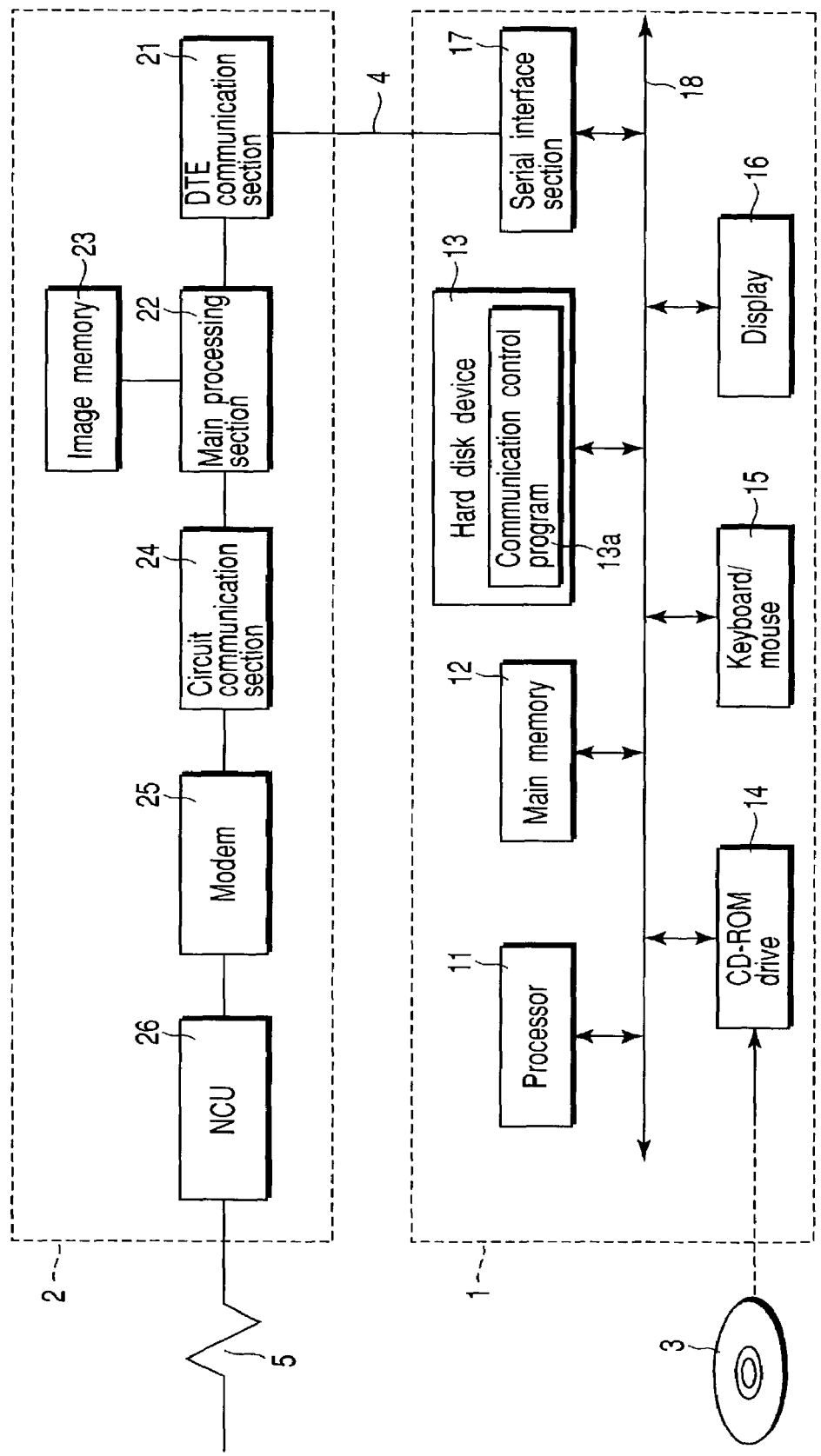
FIG. 1 is a block diagram showing a facsimile system according to an embodiment of the present invention.

FIG. 1 is a block diagram showing a facsimile system according to the embodiment.

As shown in FIG. 1, the facsimile system of the embodiment is comprised by a facsimile data terminal equipment (facsimile DTE) 1 and facsimile data circuit-terminating equipment (facsimile DCE) 2.

The facsimile DTE 1 comprises a processor 11, main memory 12, hard disk device 13, CD-ROM drive 14, keyboard/mouse 15, display 16, and serial interface section 17. These sections are connected to each other via a bus 18.

The processor 11 performs various control processes by executing software processing in accordance with a program stored in the hard disk device 13.

The main memory 12 temporarily stores software actually used by the processor 11 or other data.

The hard disk device 13 stores an operating system program used by the processor 11. The hard disk device 13 stores an application program, driver program, or other arbitrary data in addition to the operating system program. The hard disk device 13 also stores a communication control program 13a. The communication control program 13a causes the processor 11 to execute communication control for facsimile transmission via the facsimile DCE 2.

The CD-ROM drive 14 reads out data from a CD-ROM 3.

The keyboard/mouse 15 receives various instruction inputs by the user.

The display 16 performs image display for showing various information notifications to the user.

The serial interface section 17 is connected to the facsimile DCE 2 via a cable 4. The serial interface section 17 performs communication processing under the control of the processor 11, thereby achieving data transfer to the facsimile DCE 2.

As shown in FIG. 1, the facsimile DCE 2 comprises a DTE communication section 21, main processing section 22, image memory 23, circuit communication section 24, modem 25, and network control unit (NCU) 26.

The DTE communication section 21 is connected to the serial interface section 17 of the facsimile DTE 1 via the cable 4. The DTE communication section 21 performs communication processing under the control of the main processing section 22, thereby achieving data transfer to the facsimile DTE 1.

The main processing section 22 executes control processing for enabling the facsimile DTE 1 to perform facsimile communication by the class-2 service. In other words, the main processing section 22 asynchronously operates the DTE communication section 21 and circuit communication section 24.

The image memory 23 stores image data transmitted from the facsimile DTE 1. The image memory 23 can store at least image data of one page.

The circuit communication section 24 performs communication processing for realizing facsimile communication via a circuit 5 such as a PSTN (Public Switched Telephone Network) circuit.

The modem 25 modulates image data and a command to generate a facsimile transmission signal and a command transmission signal to be transmitted to the circuit 5. The modem 25 sends these transmission signals to the circuit 5 via the NCU 26. The modem 25 receives via the NCU 26 a facsimile transmission signal and a command transmission signal incoming through the circuit 5. The modem 25 demodulates these transmission signals to reconstruct image data and a command. The modem 25 supplies the reconstructed image data and command to the circuit communication section 24.

The NCU 26 is connected to the circuit 5. The NCU 26 monitors the state of the circuit 5 and executes originating processing to the circuit 5. The NCU 26 equalizes transmission signals sent from the modem 25 to the circuit 5, and sets the output levels of these transmission signals.

The main processing section 22 operates as a known control section for controlling the DTE communication section 21 and the circuit communication section 24 so as to perform communication in a communication sequence complying with the ITU-T recommendation T.32 by software processing. In addition, the main processing section 22 operates as an unended transmission notification section, response section, and terminating processing section.

The unended transmission notification section notifies the facsimile DTE 1 that transmission of image data to the circuit 5 has not ended at the end of a procedure of receiving the image data transferred from the facsimile DTE 1. The response section notifies the facsimile DTE 1 of the transmission progress of image data to the circuit 5 in accordance with an inquiry from the facsimile DTE 1. The terminating processing section executes a post-data transmission procedure after the response section notifies the facsimile DTE 1 of the end of transmission of image data to the circuit 5.

The operation of the facsimile system having the above arrangement will be explained.

An example of the facsimile DTE 1 is a general-purpose personal computer, and no communication control program 13a is installed first. Thus, a communication control program stored in the CD-ROM 3 is installed into the hard disk device 13 as part of facsimile system installation operation.

The communication control program 13a causes the processor 11 to operate as an inquiry section and terminating processing section. More specifically, the processor 11 executes software processing based on the communication control program 13a to operate as an inquiry section and terminating processing section.

The inquiry section inquiries the facsimile DCE 2 of the transmission progress at a predetermined timing after the facsimile DCE 2 sends a notification that transmission of image data to the circuit 5 has not ended yet. The terminating processing section executes a procedure after the end of data transmission after the facsimile DCE 2 sends a notification that transmission of image data to the circuit 5 has ended.

Figure 2:
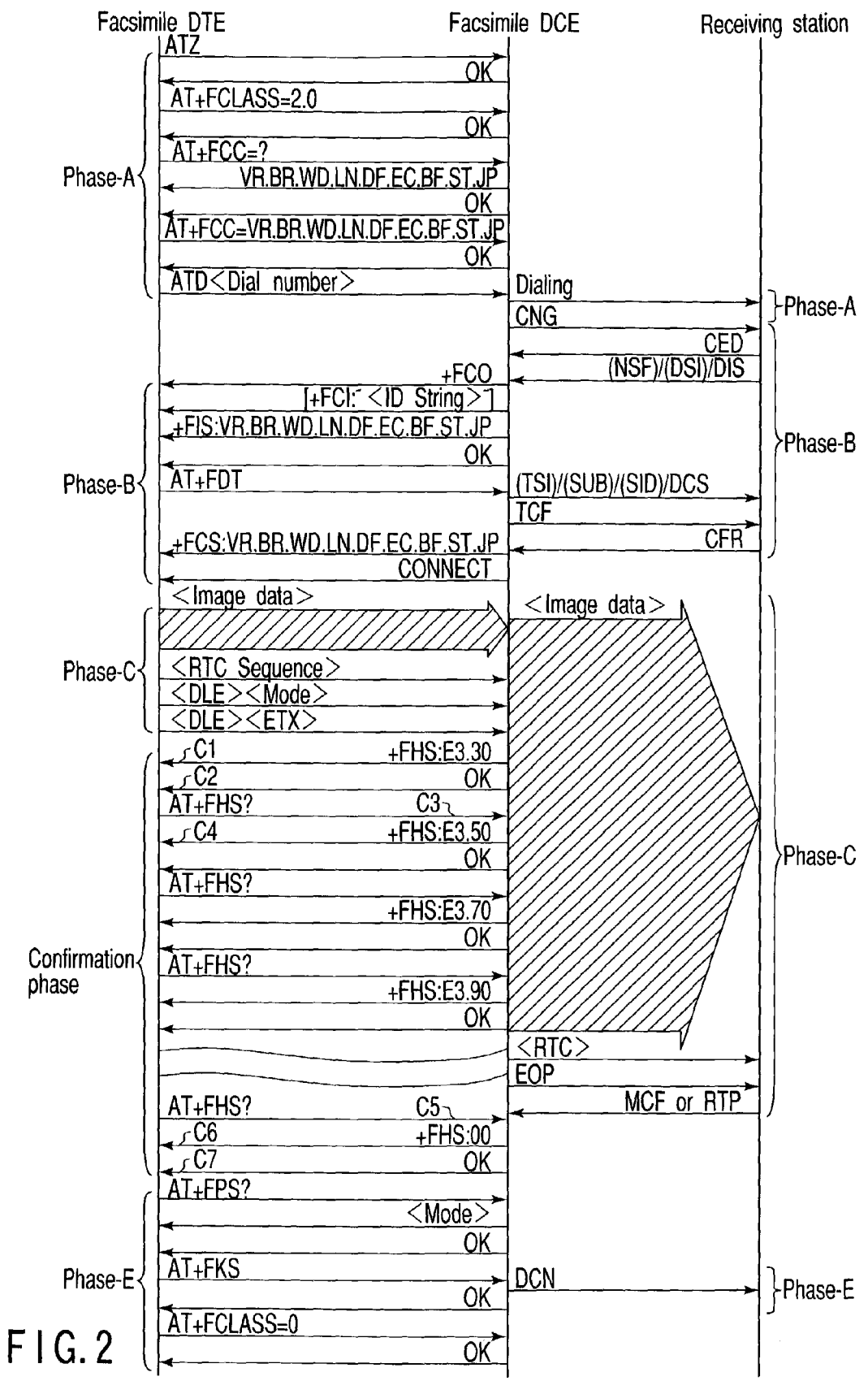
FIG. 2 is a view showing a communication sequence in the facsimile system shown in FIG. 1.

A communication sequence as shown in FIG. 2 is executed when image data is to be transmitted from the facsimile DTE 1 to the circuit 5 via the facsimile DCE 2 in this facsimile system.

As shown in FIG. 2, Phase-A, Phase-B, and Phase-C are executed in sequences prescribed by the recommendation T.32.

In Phase-C, image data is transferred. Image data transfer between the facsimile DTE 1 and the facsimile DCE 2 and image data transfer between the facsimile DCE and a receiving station may be asynchronous to each other. For this reason, Phase-C may continue between the facsimile DCE and the receiving station for a while even after Phase-C ends between the facsimile DTE 1 and the facsimile DCE 2.

In this state, the facsimile system of the embodiment executes a confirmation phase as shown in FIG. 2.

The confirmation phase starts by supplying a command representing the progress from the facsimile DCE 2 to the facsimile DTE 1 when Phase-C cannot end between the facsimile DCE and the receiving station even upon the lapse of a predetermined time after the end of Phase-C between the facsimile DTE 1 and the facsimile DCE 2.

The command representing the progress is expressed by, e.g., "+FHS: E3, nn". The use of the command "+FHS: E3" is admitted by the recommendation T.32, but the command "+FHS: E3" is not assigned a specific function. The command "+FHS: E3" is admitted to add arbitrary information with a delimiter ",". This embodiment uses the command "+FHS: E3" as a command representing that transmission of image data is in progress. Further, a numeral value representing the progress degree of image transmission is substituted into "nn". The numerical value representing the progress degree is given by % representing the ratio of image data transmitted from the facsimile DCE 2 with respect to image data transferred from the facsimile DTE 1 to the facsimile DCE 2.

In FIG. 2, the facsimile DCE 2 notifies the facsimile DTE 1 of a command C1 "+FHS: E3, 30" because the ratio of transmitted image data is 30% at the beginning of the confirmation phase. Subsequent to the command C1, the facsimile DCE 2 notifies the facsimile DTE 1 of a command C2 "OK" in accordance with the prescription of the recommendation T.32. Note that these commands are sent by the main processing section 22.

The processor 11 in the facsimile DTE 1 interprets the command C1 to recognize that transmission of image data is in progress and the progress degree is 30%. The user may be notified of these pieces of information by, e.g., display on the display 16.

If the processor 11 in the facsimile DTE 1 has been notified that transmission of image data is in progress, it notifies the facsimile DCE 2 of a command C3 "AT+FHS?" at an arbitrary timing. The command "AT+FHS?" is a status confirmation command.

After the main processing section 22 in the facsimile DCE 2 confirms that the facsimile DCE 2 has been notified of the command "AT+FHS?" from the facsimile DTE 1, the main processing section 22 confirms whether transmission of image data has ended. In FIG. 2, transmission of image data has not ended yet when the command C3 is sent. In this case, the main processing section 22 notifies the facsimile DTE 1 of a command C4 representing that transmission of image data continues. In FIG. 2, the facsimile DTE 1 is notified of a command C4 "+FHS: E3, 50" because the ratio of transmitted image data is 50%.

Thereafter, notification of the command "AT+FHS?" from the facsimile DTE 1 to the facsimile DCE 2, and notification of the command "+FHS: E3, nn" and the command "OK" from the facsimile DCE 2 to the facsimile DTE 1 in response to the command "AT+FHS?" are performed until transmission of image data from the facsimile DCE 2 ends.

If the facsimile DCE 2 is notified of a command C5 "AT+FHS?" after the end of Phase-C between the facsimile DCE 2 and the receiving station, the main processing section 22 notifies the facsimile DTE 1 of a command C6 "+FHS: 00" and a command C7 "OK". The command "+FHS: 00" is defined by the recommendation T.32 in order to notify the facsimile DTE 1 of the normal end of transmission from the facsimile DTE 1.

The confirmation phase ends at the end of exchange of the command C7. After the confirmation phase ends, the facsimile DTE 1 and facsimile DCE 2 shift to Phase-E defined by the recommendation T.32.

As described above, according to the embodiment, the facsimile DCE 2 notifies the facsimile DTE 1 that transmission of image data is in progress when transmission of the image data to the circuit cannot end even upon the lapse of a predetermined time after the facsimile DCE 2 has received the image data transferred from the facsimile DTE 1. After that, the facsimile DCE 2 notifies the facsimile DTE 1 that the transmission of image data is in progress or transmission has ended, as a response to an inquiry from the facsimile DTE 1. The processor 11 in the facsimile DTE 1 need not wait for a notification that transmission of image data has ended from the facsimile DCE 2. As a result, the processor 11 can perform other unrelated processing even during transmission of image data from the facsimile DCE 2. The processor 11 sends an inquiry to the facsimile DCE 2 by using an idle time or the like, and confirms the transmission progress of image data.

According to the embodiment, the facsimile DCE 2 notifies the facsimile DTE 1 of the ratio of transmitted image data. The facsimile DTE 1 can recognize the transmission progress of image data from the facsimile DCE 2. The facsimile DTE.1 can notify the user of the transmission progress of image data from the facsimile DCE 2. Alternatively, the facsimile DTE 1 can appropriately determine the timing of an inquiry to the facsimile DCE 2 on the basis of the transmission progress of image data from the facsimile DCE 2.

This embodiment adopts only commands prescribed by the recommendation T.32 as commands exchanged between the facsimile DTE 1 and the facsimile DCE 2 in the confirmation phase. The communication sequence can, therefore, be realized by slightly changing a sequence stipulated by the recommendation T.32.

The present invention is not limited to the above embodiment. In the embodiment, for example, the facsimile DCE 2 adds a numerical value representing the progress to a command representing that transmission of image data is in progress. Alternatively, abstract progress information such as "low", "middle", or "high" may be added. Alternatively, only a command representing whether transmission of image data is in progress may be sent without adding any progress degree information.

The above embodiment uses commands complying with the recommendation T.32. However, the present invention may employ unique commands not complying with the recommendation T.32.

The above embodiment is based on a communication sequence complying with the recommendation T.32. However, the present invention may adopt a communication sequence not complying with the recommendation T.32.

The above embodiment has exemplified an application of the present invention to a facsimile system comprised of the facsimile DTE 1 and facsimile DCE 2. However, the present invention is not limited to a facsimile system, but can also be applied when another type of data is to be transmitted.

In the above embodiment, the communication control program 13a is installed from the CD-ROM 3. However, the communication control program 13a may be installed from another type of storage medium or installed via a network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confirmation sequence in which progress of transmission of data from a data circuit-terminating equipment to a circuit is confirmed by a data terminal equipment, wherein the confirmation sequence is part of a communication sequence which performs transmission of data from the data terminal equipment to the circuit via the data circuit-terminating equipment by asynchronously executing transmission of the data from the data terminal equipment to the data circuit-terminating equipment and transmission of the data from the data circuit-terminating equipment to the circuit, wherein the confirmation sequence comprises;

sending a first command, which indicates that the transmission of the data from the data circuit-terminating equipment to the circuit has not ended, from the data circuit-terminating equipment to the data terminal equipment if the transmission of the data from the data circuit-terminating equipment to the circuit has not ended at a predetermined time after transmission of the data from the data terminal equipment to the data circuit-terminating equipment has ended, sending a second command, for requesting confirmation of the progress of the transmission of the data from the data circuit-terminating equipment to the circuit, from the data terminal equipment to the data circuit-terminating equipment at an arbitrary timing after receipt by the data terminal equipment of the first command, upon receipt of the second command by the data circuit-terminating equipment, one of: (i) again sending of the first command from the data circuit-terminating equipment if the transmission of the data from the data circuit-terminating equipment to the circuit has not ended, and (ii) sending a third command, for indicating that the transmission of the data has ended, from the data circuit-terminating equipment to the data terminal equipment if the transmission of the data from the data circuit-terminating equipment to the circuit has ended, and ending the confirmation sequence by the data terminal equipment and the data circuit-terminating equipment after the third command is sent from the data circuit-terminating equipment and received by the data terminal equipment.

2. A confirmation sequence according to claim 1, wherein the first command includes information representing a degree of progress of the transmission of the data.

3. A confirmation sequence according to claim 1, wherein the communication sequence is based on an ITU-T recommendation T.32.

4. A data circuit-terminating equipment which receives data sent from a data terminal equipment, and which sends the received data to a circuit asynchronously with reception of the data, said data circuit-terminating equipment comprising:
- an unended transmission notification section which sends a first command, which indicates that transmission of the data to the circuit has not ended, to the data terminal equipment if the transmission of the data to the circuit has not ended at a predetermined time after the reception of the data from the data terminal equipment has ended;
- a response section which, upon reception of a second command from the data terminal equipment for requesting confirmation of progress of the transmission of the data to the circuit, (i) again sends the first command to the data terminal equipment if the transmission of the data to the circuit has not ended, and (ii) sends a third command, which indicates that the transmission of the data to the circuit has ended, to the data terminal equipment if the transmission of the data to the circuit has ended; and
- a terminating processing section which executes a post-data transmission procedure between the data circuit-terminating equipment and the data terminal equipment after the third command is sent.

5. A data circuit-terminating equipment according to claim 4, wherein the first command includes information representing a degree of progress of the transmission of the data to the circuit.

6. A data circuit-terminating equipment according to claim 4, wherein communication with the data terminal equipment is performed by a communication sequence based on an ITU-T recommendation T.32.

7. A data terminal equipment which transmits data to a circuit via a data circuit-terminating equipment which asynchronously performs reception of the data and transmission of the data to the circuit, said data terminal equipment comprising:
- an inquiry section which sends a second command, for requesting confirmation of progress of the transmission of the data from the data circuit-terminating equipment to the circuit, to the data circuit-terminating equipment at an arbitrary timing after the data circuit-terminating equipment sends a first command, which indicates that the transmission of the data to the circuit has not ended, after transmission of the data to the data circuit-terminating equipment from the data terminal equipment has ended; and
- a terminating processing section which executes a post-data transmission procedure after the data circuit-terminating equipment sends a third command, which indicates that the transmission of the data to the circuit has ended, in response to the second command sent from the inquiry section.

8. A data terminal equipment according to claim 7, wherein communication with the data circuit-terminating equipment is performed by a communication sequence based on an ITU-T recommendation T.32.

9. A computer-readable storage medium which stores a communication control program which is executable by a computer having a function of transmitting data to be transmitted to a circuit to a data circuit-terminating equipment which asynchronously performs reception of the data and transmission of the data to the circuit, wherein the communication control program is executable by the computer to cause the computer to operate as:
- an inquiry section which sends a second command, for requesting confirmation of the transmission of the data from the data circuit-terminating equipment to the circuit, to the data circuit-terminating equipment at an arbitrary timing after the data circuit-terminating equipment sends a first command, which indicates that the transmission fo the data to the circuit has not ended, after transmission of the data to the data circuit-terminating equipment from the data terminal equipment has ended; and
- a terminating processing section which executes a post-data transmission procedure after the data circuit-terminating equipment sends a third command, which indicates that the transmission of the data to the circuit has ended, in response to the second command sent from the inquiry section.

* * * * *